Figure 5:
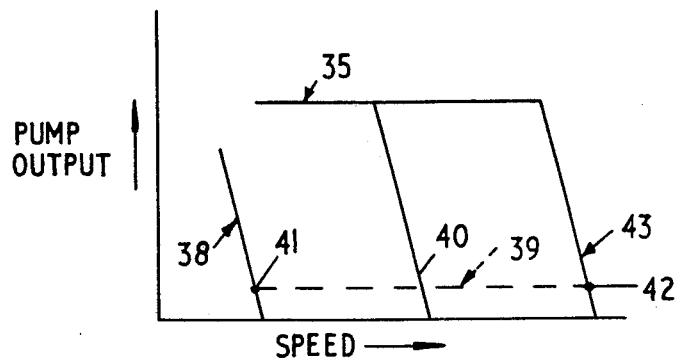

United States Patent [19]
Jones et al.

[11] 3,973,539
[45] Aug. 10, 1976

[54] FUEL SYSTEMS FOR ENGINES

[75] Inventors: Christopher Robin Jones, Solihull; Malcolm Williams, Glastonbury; Geoffrey Albert Kenyon Brunt, Alcester, all of England

[73] Assignee: C.A.V. Limited, Birmingham, England

[22] Filed: Feb. 18, 1975

[21] Appl. No.: 550,651

Related U.S. Application Data
[63] Continuation of Ser. No. 347,720, April 4, 1973, abandoned.

[30] Foreign Application Priority Data
Apr. 4, 1972 United Kingdom............... 15347/72
Apr. 4, 1972 United Kingdom............... 15348/72

[52] U.S. Cl................. 123/139 E; 123/32 EA; 123/198 DB; 290/40 F
[51] Int. Cl.²..................... F02M 39/00; F02B 3/00
[58] Field of Search............ 123/139 E, 102, 32 EA, 123/198 DB; 290/40

[56] References Cited
UNITED STATES PATENTS

| | | | |
|---|---|---|---|
| 3,630,177 | 12/1971 | Engel............................... | 123/139 E |
| 3,699,935 | 10/1972 | Adler.............................. | 123/139 E |
| 3,724,433 | 4/1973 | Voss................................ | 123/139 E |
| 3,777,174 | 12/1973 | Butscher........................ | 123/139 E |
| 3,815,564 | 6/1974 | Suda................................ | 123/139 E |

*Primary Examiner*—Charles J. Myhre
*Assistant Examiner*—Ronald B. Cox
*Attorney, Agent, or Firm*—Holman & Stern

[57] ABSTRACT

A fuel system for an engine, particularly a compression-ignition engine, has a pump supplying fuel to the engine and a control member for determining the output of the pump, the control member being itself controlled by a control circuit receiving parameters one of which is measured by transducer means. The transducer means is designed so that if it fails, the fuel system fails safe. In another arrangement, in which failure of the transducer means results in an output which would increase fuel, then the failure is detected and action is taken.

3 Claims, 8 Drawing Figures

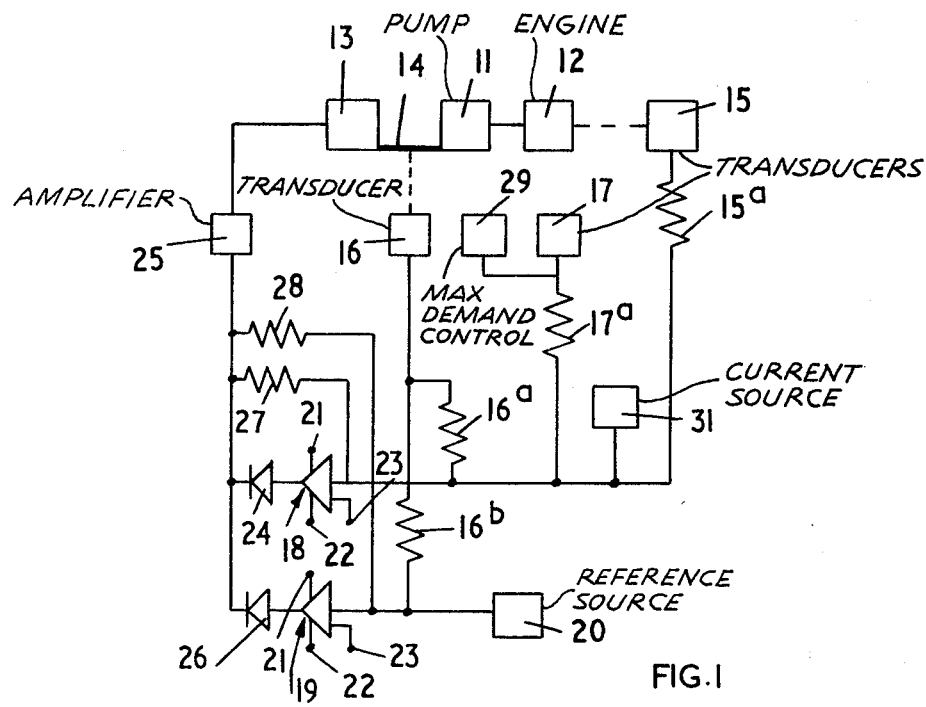
FIG.1
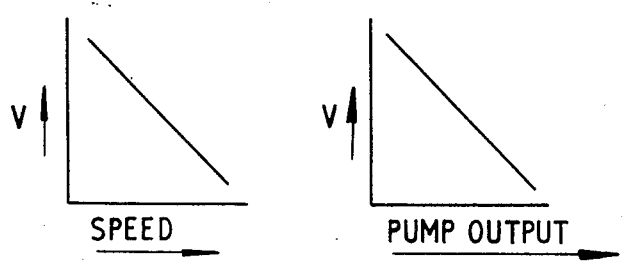
FIG. 2
FIG. 3
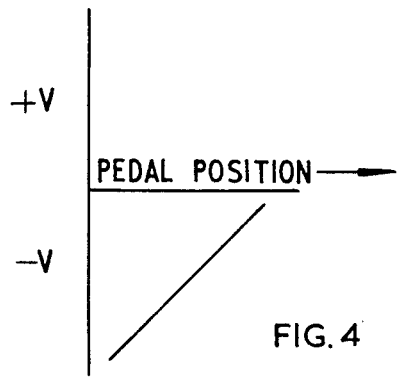
FIG. 4

3,973,539

FUEL SYSTEMS FOR ENGINES

This is a continuation of application Ser. No. 347,720 filed Apr. 4, 1973, now abandoned.

This invention relates to fuel systems for engines.

In one aspect, the invention resides in a fuel system comprising in combination a pump for supplying fuel to the engine, a control member for determining the output of the pump, an actuator for controlling the control member, a control circuit for controlling the actuator in accordance with the values of at least two system parameters, at least one of said parameters being measured by transducer means providing to the control circuit an input representing the actual value of said one parameter, and in the form of an electrical signal which decreases in magnitude as the actual value of said parameter increases, whereby failure of said transducer means results in the control circuit reacting as if said one parameter has a high value.

In another aspect, the invention resides in a fuel system comprising in combination a pump for supplying fuel to the engine, an actuator for controlling the output of the pump, a control circuit for controlling the actuator, and transducer means for providing said control circuit with at least two input signals representing parameters of the system, so as to control the fuel supply to the engine, at least one of said transducer means including an amplifier the output of which is fed to the control circuit, said amplifier having a potential fault condition in which the voltage at the output of the amplifier is such that the fuel supplied to the engine is increased, the system including means for detecting said fault condition and then reducing or cutting off the supply of fuel to the engine.

Figure 6:
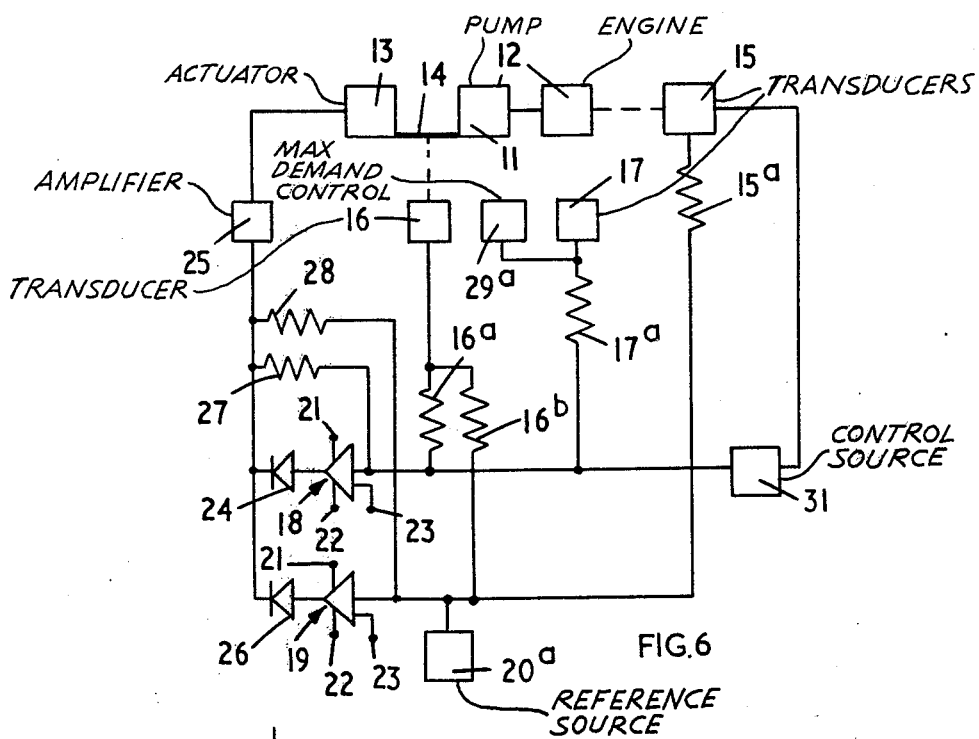
Figure 7:
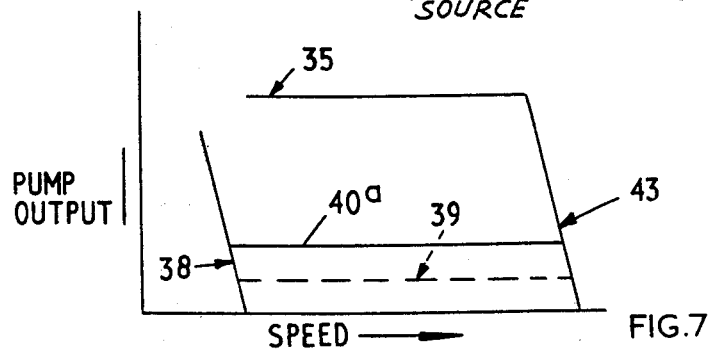
Figure 8:
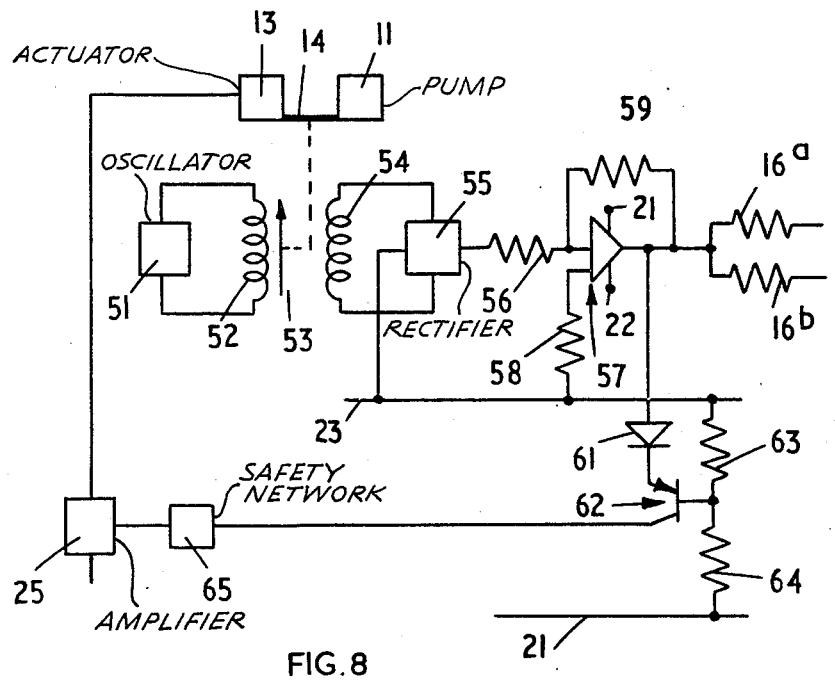

In the accompanying drawings:

FIG. 1 is a circuit diagram, partly in block form, illustrating one example of the invention, FIGS. 2 to 4 are graphs illustrating the outputs of three transducers used in FIG. 1, FIG. 5 represents a fuel-speed characteristic for an engine to be controlled by the arrangement of FIG. 1, FIG. 6 is a view similar to FIG. 1 of a second example of the invention, FIG. 7 is a view similar to FIG. 5 but showing the characteristic obtained by FIG. 6, and FIG. 8 is a circuit diagram showing a safety circuit.

All the examples described relate to a fuel injection system for a diesel engine driving a road vehicle, so that demand is set by an accelerator pedal. However, the arrangements shown can be used with other engines, and the engine employed need not drive a road vehicle, in which case the demand is of course set in some other way.

Referring first to FIG. 1, a fuel pump 11 supplies fuel to the cylinders of an engine 12 in turn, the fuel pump being driven in a conventional manner, with the timing of injection controlled in the usual way. The driving of the fuel pump forms no part of the present invention and is not therefore described. Moreover, the type of pump used is not critical, but in the example shown the pump is a conventional in-line pump having a control rod 14 the axial position of which determines the rate of supply of fuel to the engine 12 by the pump 11. The axial position of the control rod 14 is controlled by an electro-mechanical actuator 13 to determine the pump output.

The system further includes three transducers 15, 16 and 17. The transducer 15 produces an output in the form of a voltage shown in FIG. 2, the magnitude of the voltage being dependent on the rotational speed of the engine. The transducer 16 produces an output voltage shown in FIG. 3 the voltage being dependent on the rate of supply of fuel to the engine, (i.e. the pump output). For this purpose the transducer 16 conveniently senses the axial position of the control rod 14 as indicated by the dotted line. The transducer 17 produces a voltage representing demand. Typically, the transducer is controlled by the accelerator pedal of the vehicle which is driven by the engine, and in the particular example being described, the engine is controlled by an all-speed governor, so that the output from the transducer 17 is a voltage representing demanded engine speed. The form of this voltage is shown in FIG. 4, and it should be noted that the slope of this output is opposite to the slopes of the outputs from the transducers 15, 16.

The outputs from the transducers 15, 16 and 17 are all applied, by way of resistors 15a, 16a, 17a converting the voltage signals to current signals, to the inverting terminal of an operational amplifier 18 connected as a summing amplifier, whilst the output from the transducer 16 is also connected through a resistor 16b to the inverting terminal of an operational amplifier 19 connected as a summing amplifier. The amplifiers 18 and 19 are powered by positive and negative supply terminals 21, 22 and have their non-inverting terminals connected to a terminal 23 which is at a reference potential intermediate the potentials of the terminals 21, 22. The origin in FIGS. 2 to 4 is the potential of the terminal 23. Typically, the terminals 21, 23, 22 are at 20, 10 and 0 volts respectively, the supplies being derived from the vehicle battery. The output from the amplifier 18 is fed through a diode 24 to a drive circuit 25 which incorporates a power amplifier and which serves to control the electro-mechanical actuator 13. Similarly, the output terminal of the amplifier 19 is connected to the drive circuit 25 through a diode 26. The diodes 24 and 26 together constitute a discriminator, which ensures that only the amplifier 18, 19 producing the more positive output is coupled to the drive circuit 25 at any given instant. Thus, if the amplifier 18 is producing the more positive output, then the diode 26 is reverse biased, and if the amplifier 19 is producing the more positive output, the diode 24 is reverse biased. FIG. 1 also shows the feedback resistors 27, 28 associated with the amplifiers 18, 19 respectively, and it will be noted that the feedback circuit for each amplifier is taken from the input terminal of the drive circuit 25. By virtue of this arrangement, the effective forward voltage drop across the diodes 24 and 26 is reduced by a factor dependent upon the amplifier open-loop gain, and so the temperature characteristics of the diodes become negligible when considering the temperature characteristics of the system. Also, there is a very sharp changeover from control by one amplifier to control by the other amplifier.

Neglecting for the moment the amplifier 19, the amplifier 18 compares the input currents it receives from the transducer 15 and 16 with the input current it receives from the transducer 17 and varies the pump output until the sum of the current inputs at the inverting input terminal of the amplifier 18 are zero. It will be noted that in effect there is an inversion stage between the amplifiers 18, 19 and the pump 11, so that an increasing positive input to the drive circuit 25 represents a demand for a decrease in pump output.

The amplifier 19 receives a signal by way of the resistor 16b representing pump output and also receives a reference current from a reference source 20. If at any time the pump output exceeds a value set by the source 20, then the amplifier 19 produces a positive output which is more positive than the output of the amplifier 18 so that the diode 24 ceases to conduct as previously explained and the amplifier 19 produces an output to the drive circuit 25 to limit the pump output.

Referring now to FIG. 5, the way in which the governor is designed and operates can be seen from the graph of pump output against speed. The line 40 is set by the amplifier 18 by virtue of the way in which the comparison of actual and demanded speeds is modified in accordance with the input from the transducer 16. The line 40 in the drawings represents 50% demand, and is one of a family of lines stretching from 0% demand to 100% demand. The extremes of this family, that is to say no demand and full demand, are indicated at 38 and 43. The line 38 is set by a current source 31 providing an input to the inverting terminal of the amplifier 18 to ensure that the engine speed varies with pump output in the manner indicated by the line 38 even when the demand is zero. The maximum speed is set by a control 29 shown in FIG. 1 and which acts by limiting the maximum demand from the transducer 17. The line 35 is the maximum fuel line which is set by the amplifier 19 as previously explained.

The boundary line 39 is a function of the engine, not the governor, and represents the no-load fuel requirements of the engine under different demands, so that the points 41 and 42 are the no-load engine speeds at zero and full demand, (i.e. with the pedal released and fully depressed respectively).

FIG. 5 explains how the engine will behave in any circumstances. Suppose that the pedal has been set to demand 50%, corresponding to the line 40 shown in FIG. 5. The exact position on the line 40 at any given instant will depend upon the load on the engine, and so for this given setting of the pedal, the engine speed can vary within the limits set by the lines 35 and 40. The slope of the line 40 is, as previously explained, a result of the input to the amplifier 18 from the transducer 16. Assuming that the engine is operating at a particular point on the line 40, then if the vehicle starts to go up an incline, the load will increase, and so for a given position of the pedal the operating point will move up the line 40, so that the speed is reduced. If the load becomes sufficiently great, the line 35 will be reached, and no further increase in pump output will be permitted. At this point, the speed falls rapidly. If the load decreases, then the operating point moves down the line 40 with the corresponding increase in speed. If the load decreases to zero, the line 39 is reached.

If the demand is charged, then assuming for the sake of argument that it changes from 50% demand to 100% demand, the pump output will increase as rapidly as the pump and governor will allow until the line 35 is reached, and the engine will then move along the line 35 onto the maximum demand line 43, and will assume a position on the line 43 which is dependent upon the load.

If the demand is reduced, then assuming the demand is reduced from 50% to 0%, the operating point will move downwards until the fuel supply is zero. The speed then decreases until the line 38 is reached, after which the operating point moves up the line 38, finishing at a point on the line 38 determined by the load on the engine.

The design of the transducer 16 results in a substantial measure of safety in the overall system. Thus, if the transducer 16 should fail, so that its output falls to the 10 volt line as shown in FIG. 3, the system reacts as if the pump output is high. As a result, the amplifier 19 immediately exercises a control over the pump output. It will be appreciated that this safety feature is a result of the fact that the transducer 16 produces an output voltage the magnitude of which decreases as the actual value of pump output increases.

Turning now to FIG. 6, there is shown a second example in which the governor is a two-speed governor, that is to say a governor in which the demand signal is a fuel signal which is compared with the actual fuel, the pump output then being modified to provide the desired fuel output. In FIG. 6, the amplifier 18 receives a signal from the transducer 16 by way of the resistor 16a, this signal representing actual fuel. A signal representing demanded fuel is fed by way of the resistor 17a to the amplifier 18, but it will be noted that there is no speed term set to the amplifier 18 from the transducer 15. The characteristics of the system are shown in FIG. 7. The line 40a is one of a family of horizontally extending lines which are set by the governor, and can be taken to represent the 50% demand line. When the pedal sets a demand of 50%, the amplifier 18 sets the required fuel level. The operating point on the line 40a will of course then depend on the load on the engine.

The amplifier 19 overrides the amplifier 18 in FIG. 6 in a similar manner to the arrangement in FIG. 1, except that the amplifier 19 now receives a signal by way of the resistor 15a representing speed, and also a reference current from a source 20a setting the maximum engine speed. The amplifier 19 sets the maximum speed of the engine, which is indicated by the line 43 in FIG. 7. It will be noted that the line 43 has a slope, that is to say the maximum permitted speed varies with pump output. This slope is obtained by feeding to the amplifier 19 a signal representing pump output, this signal being fed by way of the resistor 16b.

The maximum pump output, that is to say the line 35 in FIG. 7, is set by a control 29a which limits the maximum demand, in much the same way as the control 29 limits the maximum speed in FIG. 1. The minimum engine speed, indicated by the line 38, is set by a current source, 31a, which is similar to the current source 31 except that because the current source 31a acts on the amplifier 18, which does not receive a speed term, the current source 31a must receive a speed term as indicated by its connection to the transducer 15.

The same safety features are to be found in FIG. 6 as those described with reference to FIG. 1. Thus, if the transducer 16 fails and its output falls to the 10 volt line, then the amplifier 18 reduces the pump output.

Turning now to FIG. 8, there is shown one form of the transducer 16. The transducer 16 incorporates a square wave oscillator 51 feeding the primary winding 52 of a transformer having a movable part 53 and a secondary winding 54. The position of the part 53 is determined by the position of the control rod 14, so that the amplitude of the a.c. signal in the secondary winding 54 represents the position of the control rod 14. The arrangement is such that the coupling increases as the pump output reduces, so that the maximum coupling is obtained for zero pump output. In this way, the required characteristics, shown in FIG. 3, can be obtained. Also, an open-circuit in the cable from the transducer results in the circuit failing safe.

The ends of the winding 54 are connected to the input terminals of a full-wave rectifier 55, one output terminal of the rectifier 55 being connected to the terminal 23, and its other output terminal being connected through a resistor 56 to the inverting input terminal of an operational amplifier 57 having its non-inverting input terminal connected to the terminal 23 through a resistor 58. The amplifier 57 is connected as a summing amplifier, and for this purpose its output terminal is connected to its inverting input terminal through a resistor 59. The output terminal of the amplifier 57 provides the required signals by way of the resistors 16a and 16b to the remainder of the circuit.

As previously explained, in the event of transducer failure resulting in the voltage at the output terminal of the amplifier 57 falling to 10 volts, the system fails safe. However, there may be some circumstances in which a failure results in a high output voltage at the output terminal of the amplifier 57. In order to cater for this possibility, the output terminal of the amplifier 57 is connected through a diode 61 to the emitter of a p-n-p transistor 62, the base of which is connected to the junction of a pair of resistors 63, 64 connected between the terminals 23, 21. The collector of the transistor 62 is coupled to a safety network 65 which, when operative, provides an input to the amplifier 25 to limit or cut off the supply of fuel to the engine. It will be seen that the transistor 62 has its base held at a constant potential. In normal operation, the emitter of the transistor 62 does not rise to a sufficiently high potential to turn the transistor 62 on. However, in the event of a fault resulting in a high potential at the output terminal of the amplifier 57, the transistor 62 turns on, and its collector current operates the safety network 65 to effect the required control.

Obviously, the transistor 62 could have its emitter potential fixed and its base potential varied.

In another modification of FIG. 8, instead of the rectifier 55 and resistor 56, the winding 54 has one end connected to the line 23, and its other end connected to the line 23 through a switching device (e.g. a field effect transistor) and a capacitor in series. The junction of the device and the capacitor is connected to the non-inverting input terminal of the amplifier 57. The device is switched on at the appropriate times to rectify the output from the winding 54 and charge the capacitor, and the safety features already described are unaffected.

We claim:

1. A fuel system for an engine comprising in combination a pump for supplying fuel to the engine, an actuator for controlling the output of the pump, a control circuit for controlling the actuator, and transducer means for providing said control circuit with at least two input signals representing parameters of the system, so as to control the fuel supply to the engine, one of said transducer means comprising a transformer having a primary winding and a secondary winding, means for supplying an alternating signal to the primary winding, a rectifier for rectifying the voltage developed across the secondary winding, further means coupled to said actuator, the setting of said further means being dependent upon the sett of said actuator and acting to vary the coupling between said primary and second windings, the output of said rectifier being applied to the input of an amplifier the output of which is fed to the contrl circuit, said amplifier having a potential fault condition in which the voltage at the output of the amplifier is such that the fuel supplied to the engine is increased, the system including means for detecting said fault condition and then reducing or cutting off the supply of fuel to the engine.

2. A system as claimed in claim 1 in which the fault condition is detected by a transistor the conduction state of which is changed when said fault condition occurs.

3. A system as claimed in claim 2 in which the transistor has its base held at a predetermined voltage, and its emitter output to the output from the amplifier so that the transistor conducts when said fault condition occurs.

* * * * *